United States Patent
Townsend

[11] 3,892,009
[45] July 1, 1975

[54] MEANS OF CONVEYING PLASTIC MATERIAL THROUGH A CONDUIT

[75] Inventor: Ray T. Townsend, Des Moines, Iowa

[73] Assignee: Townsend Engineering Company, Des Moines, Iowa

[22] Filed: Aug. 15, 1973

[21] Appl. No.: 388,469

Related U.S. Application Data

[62] Division of Ser. No. 222,088, Jan. 31, 1972, abandoned.

[52] U.S. Cl. .................................................. 17/35
[51] Int. Cl.² .......................................... A22C 11/02
[58] Field of Search ............ 17/35, 41, 33; 141/313, 141/374; 99/109

[56] References Cited
UNITED STATES PATENTS

| | | |
|---|---|---|
| 1,484,741 | 2/1924 | Schonland, Jr. .................. 17/41 X |
| 3,399,423 | 9/1968 | Kielsmeier .......................... 17/35 |

*Primary Examiner*—Louis G. Mancene
*Assistant Examiner*—J. N. Eskovitz
*Attorney, Agent, or Firm*—Zarley, McKee, Thomte & Voorhees

[57] ABSTRACT

A means of conveying plastic material through a conduit or passageway is disclosed herein which is ideally suited for use in conveying meat emulsion, bread dough, cheese, and other plastic organic or inorganic materials. The apparatus includes a rotatable conduit or passageway having its intake end in communication with the material being conveyed. A liquid passageway means is in communication with the intake end of the conduit to introduce a film of liquid between the interior wall of the conduit and the exterior surface of the material being moved therethrough so that the liquid serves as a lubricant.

19 Claims, 6 Drawing Figures

MEANS OF CONVEYING PLASTIC MATERIAL THROUGH A CONDUIT

This is a divisional application of co-pending application Ser. No. 222,088 filed Jan. 31, 1972 and now abandoned.

Throughout the history of sausage making, there has always been a problem with damage to the meat when the sausage is stuffed into the casing. Originally, a large piston type stuffer was used to apply pressure on the ground or chopped meat product so that the meat was extruded out of a tubular horn or tube attached to the stuffer. In operation, the casing was threaded or sheared over the horn with a knot in the starting end of the casing so that as the meat was extruded out of the horn, the knotted end caused the casing to be fed off of the tube against a slight restricting force of the operator's fingers. In more recent years, rather than piston stuffers, various types of meat pumps have been used in place of the piston stuffer. In all cases, it is necessary to use a stuffing tube or horn to handle the casing and because of the tube it requires substantial pressure to extrude the meat. The substantial pressure required is due to the wadding effect of the meat moving through the stuffing tube similar to the effect of a cleaning rag being pushed through the barrel of a gun. The longer the stuffing tube, the higher pressure required to push the meat product. A pressure of 100 pounds per square inch is normal to extrude most sausage products while 150 to 200 pounds per square inch (even up to 400 pounds per square inch for certain forms) is not unusual.

One of the biggest problems with the stuffing and linking of sausage product is meat damage. This damage varies with the type of sausage and the conditions under which it is handled, such as temperature, pressure, rate, etc. and some of the more fragile products are almost impossible to handle without at least some damage. This damage results in at least two problems. The first problem is that because of the pressure and manipulation of the meat, the protein cells are broken down so that they will not absorb and hold the fat in suspension. The fat shorts out during cooking to give the appearance of large fat areas or bubbles embedded in the sausage after cooking. A second problem of meat damage, and the one that is most prevalent, is smear. As the sausage is stuffed through the stuffing tube into the casing, the fat substances are smeared along the stuffing tube, and from there along the surface of the casing, so that in appearance the sausage seems to have much more fat and less red lean than it actually has. This phenomena is referred to as smear and is a very serious problem with the sausage making part of the meat industry. The smear problem has always been very prevalent especially with some of the more fragile products.

When the sausage product slides along the metal surface of a mechanism or a transfer line, and especially the stuffing tube or horn, the sliding action mangles and smears the fat particles near the surface. Attempts have been made to use other materials such as Teflon, etc. but a low coefficient of friction material seems to have little or no benefit because the sausage meat seems to have a tackiness or tendency to adhere to the surface, rather than slide on the surface, regardless of the material. Many attempts have been made to overcome the objectionable smear appearance. One such attempt was to put an irregular end on the stuffing tube so that as the sausage is extruded into the casing, the irregularity of the stuffing tube would stir the sausage to leave more red meat on the surface rather than the objectionable layer of fat. This attempt has met with some success but it is important that improvements be made thereon.

Therefore, it is a principal object of this invention to provide a method and means of conveying plastic material through a conduit.

A further object of this invention is to provide a method and means of conveying meat products through a conduit.

A further object of this invention is to provide a method and means of conveying meat product through a meat encasing apparatus which prevents damage to the meat product.

A further object of this invention is to provide a method and means of conveying meat product through an encasing apparatus wherein liquid is introduced between the material and the confining surfaces to act as a lubricant therebetween.

A further object of this invention is to provide a method and means of conveying meat material through a meat handling apparatus which results in a superior product in both appearance and quality.

A further object of this invention is to provide a method and means of conveying meat product through an encasing machine which prevents the protein cells from becoming broken and which eliminates or reduces smear.

A further object of this invention is to provide a method and means of conveying meat product through an encasing apparatus which permits the pressure on the meat product to be substantially reduced.

A further object of this invention is to provide a method and means of conveying plastic material through a conduit which is economical to manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

Figure 1:
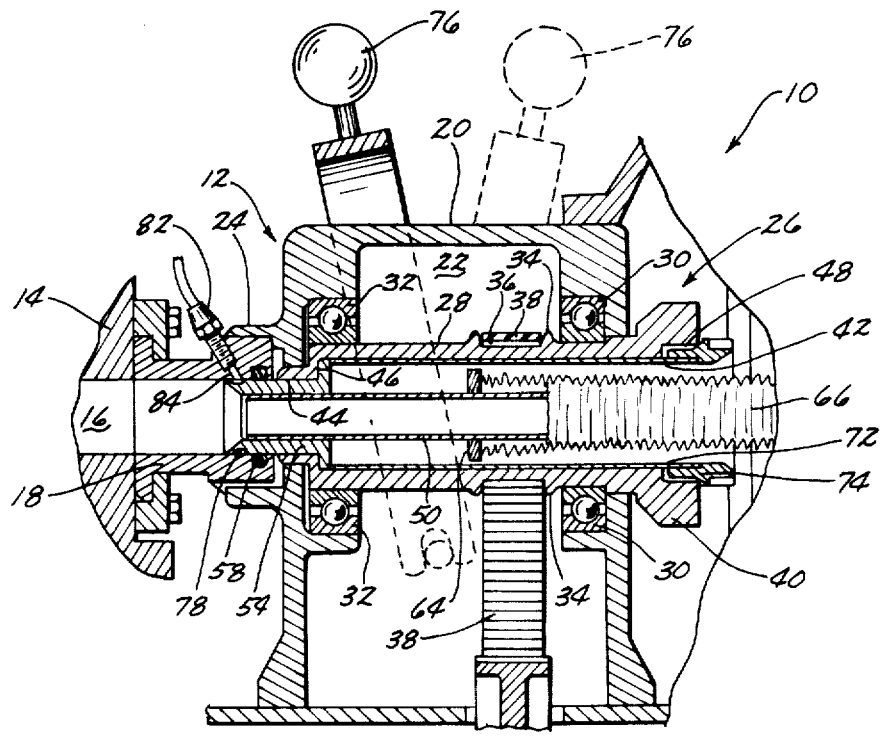
FIG. 1 is a partial sectional view taken through a portion of an apparatus for encasing a meat product.
Figure 2:
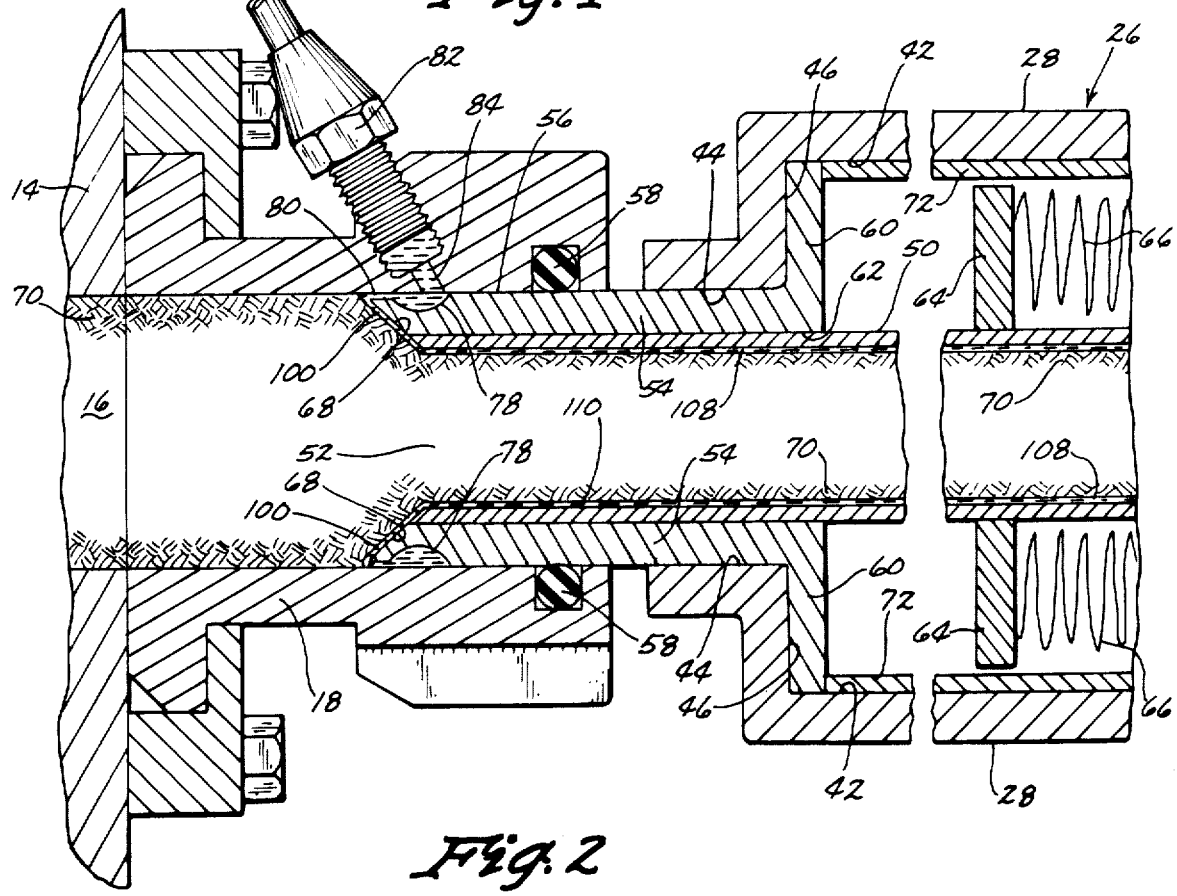
FIG. 2 is an enlarged sectional view of a portion of the apparatus for encasing the meat product.

With respect to FIGS. 1 and 2, the numeral 10 refers generally to an apparatus for encasing a product so as to produce sausages, franks and the like. Apparatus 10 includes a casing filling machine 12 and would normally include a linking apparatus, looping apparatus and support cabinet, which have not been shown.

Casing filling machine 12 includes a product pump 14 which is adapted to pump products of plastic consistency. Product pumps of this type are known in the art and therefore further description of pump 14 is unnecessary other than to state that it includes an inlet adapted to be connected to a conduit leading from a supply of plastic product and further includes an outlet 16 through which the product is pumped. Operatively secured over outlet 16 is a connecting conduit 18 which is adapted to receive the plastic product being pumped through outlet 16. The utility of this invention is not limited to the use of a pump, for the invention is useful even in stuffing by hand.

A spindle housing 20 includes a chamber 22 therein and further includes an inlet coupling 24 adapted for retentively receiving connecting conduit 18 therein. Rotatably mounted within housing 20 is a spindle assembly 26 which includes a spindle tube 28. Spindle tube 28 is rotatably journaled in housing 20 by means of front and rear bearings 30 and 32, respectively. Spindle tube 28 includes a belt receiving track 34 on its outer surface which has a plurality of small teeth 36 adapted to engage teeth on the interior surface of a drive belt 38 which is trained around track 34. Spindle tube 28 is provided with a head 40 adjacent its forward end and has an elongated bore 42 extending therethrough. Bore 42 has a minor bore 44 adjacent its rearward end which has a diameter slightly less than bore 42 to present an annular shoulder 46 therebetween. Bore 42 is also provided with a threaded portion 48 at its forward end.

Rigidly mounted within spindle tube 28 is a stuffing tube 50 having an intake opening 52 at its rearward end and a discharge opening (now shown) at its forward end. The rearward end of stuffing tube 50 is press fitted or otherwise rigidly mounted within a cylindrical mounting slug 54. Mounting slug 54 includes a cylindrical outer surface 56 which is adapted to slidably fit within minor bore 44 of spindle tube 42 and protrude axially outwardly therefrom into connecting conduit 18. A sealing ring 58 on the interior of conduit 18 provides sealing between the interior of conduit 18 and the exterior surface 56 of mounting slug 54 so that mounting slug 54 can rotate within conduit 18 and simultaneously be sealed therein. Mounting slug 54 includes an annular rim flange 60 which is adapted to abut against shoulder 46 so as to limit the rearward movement of slug 54 within spindle tube 28. Slug 54 includes a tube receiving bore 62 extending therethrough for receiving stuffing tube 50 with a press fit so that stuffing tube 50 and mounting slug 54 are rigidly secured to one another. Casing follower 64 is slidably mounted on stuffing tube 50 for following the casing 66. Adjacent the rearward end of tube receiving bore 62 is a beveled funnel-like opening 68 which is in communication with the interior of connecting conduit 18 so as to permit passage of plastic product 70 from outlet 16 of pump 14, through connecting conduit 18 and into the interior of stuffing tube 50.

Mounting slug 54 is rigidly secured within the spindle tube 28 by means of a locking cylinder 72. Locking cylinder 72 includes a threaded head 74 adapted to be threadably retained within threaded portion 48 of elongated bore 42. Locking cylinder 72 extends rearwardly within the spindle tube 28 and at its rearward end engages annular rim flange 60 of mounting slug 54 thereby pressing it against the shoulder 46 of spindle tube 28. Thus, mounting slug 54 and stuffing tube 50 are rigidly mounted within spindle tube 42 so that rotation of spindle tube 28 causes mounting slug 54 and stuffing tube 50 to rotate in unison therewith. Suitable power means is connected to drive belt 38 for rotating spindle assembly 26. Spindle handle 76 is provided to control operations or functions not related to the instant invention.

An arcuate, annular channel 78 is formed in the exterior surface 56 of mounting slug 54 forwardly of the rearward end thereof as illustrated in FIG. 2. The extreme rearward end of mounting slug 54 has a reduced outside diameter portion to provide an annular passageway 80 which extends rearwardly from channel 78 to the rearward end of mounting slug 54. A fluid inlet coupling 82 is threadably mounted on conduit 18 and is in communication with inlet port 84 extending through conduit 18 as shown in FIG. 2. Inlet coupling 82 is in communication with a source of fluid under predetermined pressure for supplying the fluid, such as water, to the port 84, channel 78 and passageway 80.

Figure 3:
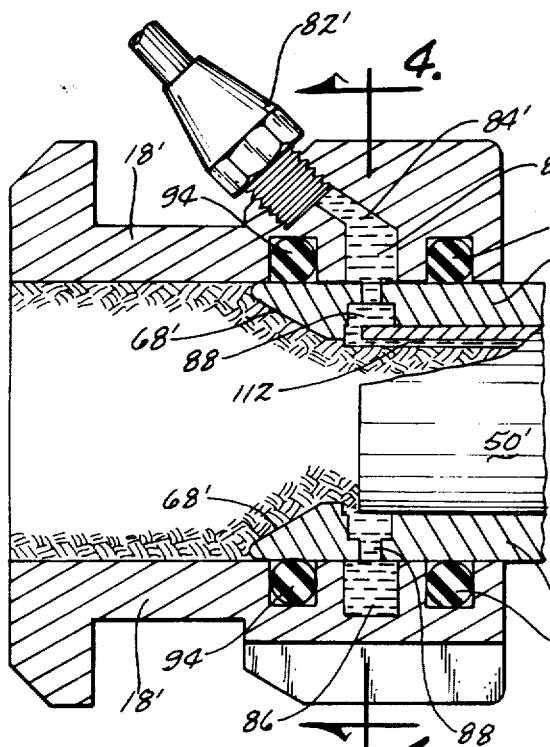
FIG. 3 is a sectional view similar to FIG. 2 except that a modified form of the invention is illustrated.
Figure 4:
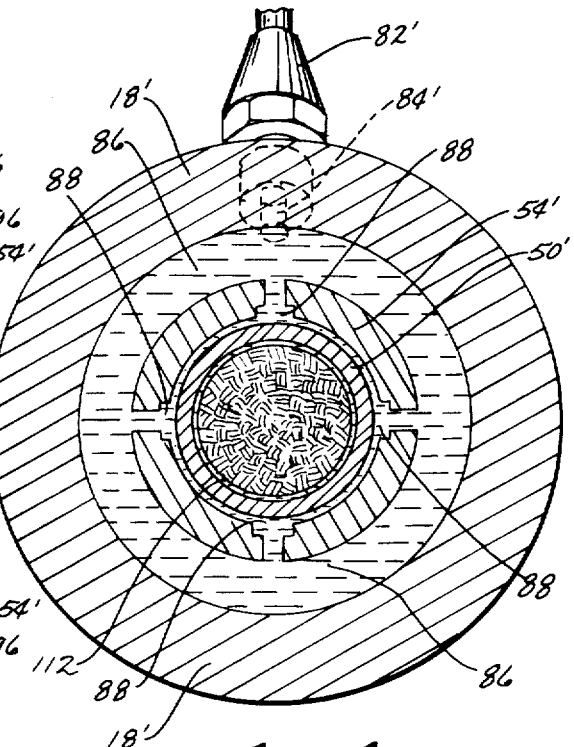
FIG. 4 is a sectional view seen along lines 4—4 of FIG. 3.

A modified form of the invention is illustrated in FIGS. 3 and 4. Inlet coupling 82' is in communication with an inlet port 84' formed in conduit 18'. Conduit 18' has an annular channel or groove 86 formed therein extending outwardly from the interior of conduit 18' as seen in FIGS. 3 and 4. Channel 86 is in communication with port 84'. Mounting slug 54' has a plurality of spaced apart bores 88 formed therein extending therethrough forwardly of its rearward end which communicate with channel 86. As seen in FIGS. 3 and 4, the bores 88 have reduced diameter portions at their outer ends. As seen in FIG. 4, the rearward end of stuffing tube 50' does not extend all the way to the funnel-like opening 68' formed in mounting slug 54' but terminates short of a shoulder 92 formed in mounting slug 54 for a purpose to be described in detail hereinafter. Seals 94 and 96 are provided in conduit 18' on opposite sides of channel 86 to prevent the escape of fluid outwardly between the mating surfaces of conduit 18' and mounting slug 54'.

Figure 5:
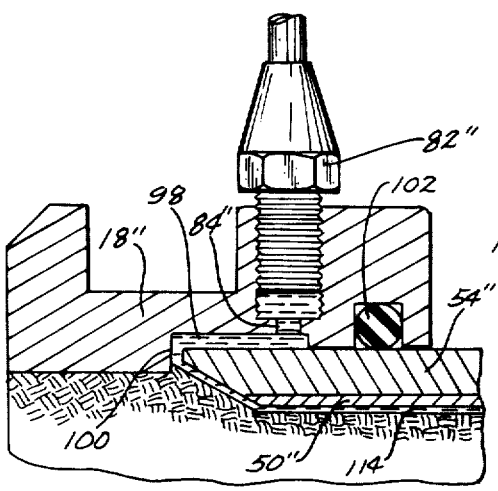
FIG. 5 is a sectional view similar to FIG. 4 except that a still further modified form of the invention is disclosed.

A still further modified form of the invention is shown in FIG. 5. Inlet conduit 82'' communicates with port 84'' formed in conduit 18''. An annular channel 98 is formed in the interior surface of conduit 18'' and communicates with port 84''. The rearward end of channel 98 is defined by an annular shoulder 100 which extends transversely inwardly therefrom. As seen in FIG. 5, the inner end of shoulder 100 terminates inwardly of the outer rearward end of mounting slug 54''. In FIG. 5, the numeral 50'' refers to a stuffing tube identical to that shown in FIGS. 1 and 2. Seal 102 is provided in conduit 18'' for the same purposes as seal 58 in FIGS. 1 and 2.

Figure 6:
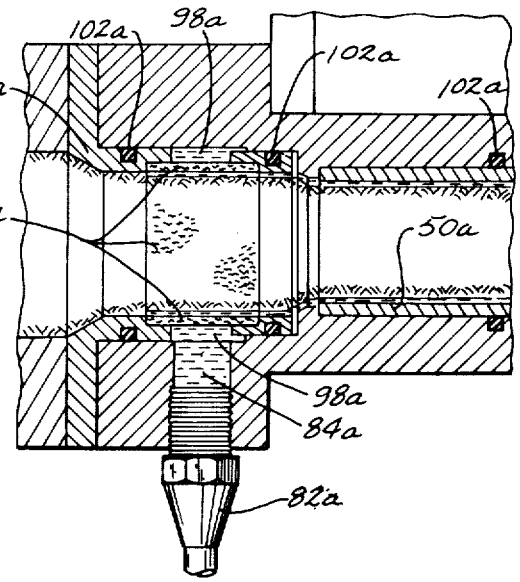
FIG. 6 is a sectional view similar to FIG. 4 except that a still further modified form of the invention is disclosed.

A still further modified form of the invention is shown in FIG. 6. Inlet conduit 82a communicates with port 84a formed in conduit 18a. An annular channel 98a is formed in the interior surface of conduit 18a and communicates with port 84a. The numeral 54a is a mounting slug which receives stuffing tube 50a. Seal 102a is provided in conduit 18a to serve the same purpose as seal 102 in FIG. 5.

A cylindrical restricting meter or filter means 104 is positioned coextensively with channel 98a. Means 104 may be comprised of sintered metal having openings preferably from a half to 2 microns in size, and preferably not larger than 4 or 5 microns. The means 104 permits the lubricating phenomena to take place with a 2 to 5 pound pressure differential between fluid and emulsion. Furthermore there will be no back-up of the emulsion through the means 104 even if the water pressure was shut off.

The operation of the machine illustrated in FIGS. 1 and 2 is as follows. Prior to activating the meat encasing apparatus, the source of water pressure in communication with coupling 82 is activated so as to supply water thereto under pressure of approximately 100 pounds per square inch. The meat encasing apparatus is then activated with the meat pump preferably applying pressure to the meat of approximately 30 pounds per square inch. Activation of the apparatus causes the spindle 26 to be rotated as the meat product is pumped from the outlet 16, through conduit 18 and into the rearward end of the stuffing tube 50. FIG. 2 illustrates the path which the water takes as it is pumped into the conduit 18. The passageway 80 is preferably formed so that a clearance of 0.001 inch is present between the interior wall surface of conduit 18 and the rearward end of the mounting slug 54. However, smaller tolerances are known to provide satisfactory results. The water is forced rearwardly from the rearward end of the passageway 80 and engages the advancing meat product which is genrally referred to by the reference numeral 70. Once the water has joined the emulsion, the pressure on the water and the fluid becomes the same. The liquid forms a lubricating film between the meat product and the rearward end of the mounting slug 54 as illustrated in FIG. 2 and is generally referred to by the reference numeral 106. As the product advances, the water creates a continuous film in intimate contact with the interior surface 108 of stuffing tube 50 and the exterior surface of the meat product being pumped therethrough. The film of liquid between the product in tube 50 and the stuffing tube 50 is referred to generally by the reference numeral 110. The fact that the mounting slug 54 and stuffing tube 50 are being rotated with respect to the meat product insures that the liquid will be introduced between the confining surfaces and the meat product in a uniform and continuous film so as to achieve the desirable lubricating qualities. It is important that the water be introduced under pressure completely around the mounting slug 54 and this is achieved by the annular channel 78.

The resulting product is superior in appearance since the lubricating qualities of the water prevent damage to the fat cells and prevent smear from occurring. The lubricating qualities of the water are defintely established since it has been found that the meat pressure will rise to 125 pounds per square inch when the water is not utilized. It is also preferred that the water pressure be higher than the meat pressure so as to achieve the proper end results. The fact that the water pressure is greater than the meat pressure also prevents the passageway 80 from becoming clogged with meat fibers. However, in some instances, capillary action of fluid through a filter means or the like may permit a substantial reduction or even an elimination of the greater water pressure.

The apparatus of FIGS. 3 and 4 generally achieve the same end results as the preferred embodiment of FIGS. 1 and 2. The apparatus of FIGS. 3 and 4 does introduce the film of liquid between the meat product and the interior of the stuffing tube and such film is generally referred to by the reference numeral 112. The annular shoulder 92 aids in directing the water forwardly into the interior of the tube 50' as the meat product is being pumped therethrough. Likewise, the embodiment of FIG. 5 also introduces the liquid film between the meat product and the confining surfaces and such film is generally referred to by the reference numeral 114. The shoulder 100 tends to aid in directing the film of water forwardly towards the stuffing tube 50. The device of FIG. 6 lowers the pressure differential between the fluid and emulsion at the point of injection, and eliminates any back-up of emulsion into the fluid line. The filter 104 provides an even flow of water and eliminates the necessity of rotating the stuffing tube 50a.

The drawings illustrate the means by which liquid is employed to lubricate the interior wall of a stuffing tube but it should be understood that the liquid could also be used to lubricate all surfaces which are in contact with the meat being conveyed therethrough, such as the interior surfaces of a pump. It should also be noted that the apparatus disclosed in the drawings may also be used for other plastic materials other than meat product as described herein.

Similar problems exist in conveying plastic material other than meat products through conveying apparatus, and this invention also pertains to such problems as the conveying of cheese, bread dough, and other material of both organic and inorganic nature. Since the invention is particularly adaptable to the meat emulsion conveying art, reference to this art has been made in describing the invention.

Thus it can be seen that the method and means accomplishes at least all of its stated objectives.

I claim:

1. A device of the class described comprising,
   an enclosed conveying passageway having a substantially continuous interior wall, said conveying passageway having an intake end,
   a source of plastic material in communication with the intake end of said conveying passageway,
   means for subjecting said plastic material to pressure whereby said material will be moved through said conveying passageway,
   a source of liquid under pressure,
   a liquid passageway in communication with said source of liquid and said conveying passageway adjacent the intake end of said conveying passageway,
   and means adjacent said conveying passageway for causing said liquid to create a film of liquid in intimate contact with said interior wall and said material whereby said liquid will serve as a lubricant between said material and said interior wall.

2. The device of claim 1 wherein said means adjacent said conveying means comprises an annular channel means extending around the intake end of said conveying passageway whereby said film of liquid is introduced continuously around the entire inner perimeter of said conveying passageway.

3. The device of claim 1 wherein at least a portion of said conveying passageway is rotatable about its longitudinal axis.

4. The apparatus of claim 1 wherein said means adjacent said conveying passageway includes a filter means through which said liquid flows into said passageway.

5. The apparatus of claim 4 wherein said filter means is of a sintered metal material.

6. The apparatus of claim 4 wherein said filter means is a porus material.

7. The apparatus of claim 1 wherein said means adjacent said conveying passageway includes a metering means through which said liquid flows into said passageway.

8. The apparatus of claim 1 wherein said means adjacent said conveying passageway includes a restriction means through which said liquid flows into said passageway.

9. In a meat product encasing apparatus,
a support means,
a stuffing tube means having intake and discharge ends and a substantially continuous interior wall extending between said intake and discharge ends,
said stuffing tube means being mounted on said support means and having its intake end in communication with a source of meat product under pressure and its discharge end in operative communication with a casing means whereby the meat product will be moved through said stuffing tube means into said casing means,
means communicating with a source of liquid under pressure and said stuffing tube means at said intake end thereof, for creating a film of liquid in intimate contact with substantially the entire length of said interior wall of said stuffing tube means and the meat product moving therethrough so that said film of liquid will serve as a lubricant between said meat product and said interior wall.

10. The apparatus of claim 9 wherein a support member embraces the intake end of said stuffing tube means and has a first end positioned adjacent the intake end of said stuffing tube means, a conduit means embracing said first end of said support member, said meat product being moved through said conduit means into the intake end of said stuffing tube means, said liquid passageway adapted to supply the liquid to the said first end of said support member.

11. The apparatus of claim 10 wherein said liquid passageway comprises an annular channel formed at the surface of said support member spaced from its said one end and a communicating passageway extending from said channel to said one end of said support member, said conduit means having a bore formed therein which is in communication with the source of liquid and said channel.

12. The apparatus of claim 11 wherein said one end of said support member has a funnel-like configuration, said intake end of said stuffing tube means having a beveled end which is in alignment with said funnel-like one end of said support member.

13. The apparatus of claim 10 wherein said liquid passageway comprises a plurality of spaced apart, radially extending openings formed in said support member which communicate at their inner ends with said stuffing tube means adjacent the intake end thereof, said conduit means having an annular channel formed therein which communicates with said openings and with said source of liquid.

14. The apparatus of claim 13 wherein said one end of said support member has a funnel-like configuration.

15. The apparatus of claim 10 wherein means is provided on said conduit means for directing the flow of liquid over the said one end of said support member and into said stuffing tube means.

16. The apparatus of claim 13 wherein said means for directing the flow of liquid comprises an annular shoulder means in communication with said liquid passageway.

17. In a meat product encasing apparatus,
a support means,
a stuffing tube means having intake and discharge ends and a substantially continuous interior wall,
said stuffing tube means being mounted on said support means and having its intake end in communication with a source of meat product under pressure and its discharge end in operative communication with a casing means whereby the meat product will be moved through said stuffing tube means into said casing means,
a liquid passageway means in communication with a source of liquid under pressure and said stuffing tube means adjacent the intake end thereof, whereby said liquid will create a film of liquid in intimate contact with said interior wall of said stuffing tube means and the meat product moving thereghrough so that said film of liquid will serve as a lubricant between said meat product and said interior wall,
said stuffing tube means being rotatably mounted on said support means.

18. In a meat product encasing apparatus,
a support means,
a stuffing tube means having intake and discharge ends and a substantially continuous interior wall,
said stuffing tube means being mounted on said support means and having its intake end in communication with a source of meat product under pressure and its discharge end in operative communication with a casing means whereby the meat product will be moved through said stuffing tube means into said casing means,
a liquid passageway means in communication with a source of liquid under pressure and said stuffing tube means adjacent the intake end thereof, whereby said liquid will create a film of liquid in intimate contact with said interior wall of said stuffing tube means and the meat product moving therethrough so that said film of liquid will serve as a lubricant between said meat product and said interior wall,
a support member embracing the intake end of said stuffing tube means and having a first end positioned adjacent the intake end of said stuffing tube means, a conduit means embracing said first end of said support member, said meat product being moved through said conduit means into the intake end of said stuffing tube means, said liquid passageway adapted to supply the liquid to the said first end of said support member,
said liquid passageway comprising an annular channel formed at the surface of said support member spaced from its said one end and a communicating passageway extending from said channel to said one end of said support member, said conduit means having a bore formed therein which is in communication with the source of liquid and said channel,
said support member being rotatably mounted in said conduit means, said stuffing tube being rotatable with said support member.

19. In a meat product encasing apparatus, a support means, a stuffing tube means having intake and discharge ends and a substantially continuous interior wall, said stuffing tube means being mounted on said support means and having its intake end in communication with a source of meat product under pressure and its discharge end in operative communication with a casing means whereby the meat product will be moved through said stuffing tube means said casing means, a liquid passageway means in communication with a source of liquid under pressure and said stuffing tube means adjacent the intake end thereof, whereby said liquid will create a film of liquid in intimate contact with said interior wall of said stuffing tube means and the meat product moving therethrough so that said film of liquid will serve as a lubricant between said meat product and said interior wall, a support member embracing the intake end of said stuffing tube means and having a first end positioned adjacent the intake end of said stuffing tube means, a conduit means embracing said first end of said support member, said meat product being moved through said conduit means into the intake end of said stuffing tube means, said liquid passageway adapted to supply the liquid to the said first end of said support member, said liquid passageway comprising an annular channel formed at the surface of said support member spaced from its said one end and a communicating passageway extending from said channel to said one end of said support member, said conduit means having a bore formed therein which is in communication with the source of liquid and said channel, said liquid passageway comprising a plurality of spaced apart, radially extending openings formed in said support member which communicate at their inner ends with said stuffing tube means adjacent the intake end thereof, said conduit means having an annular channel formed therein which communicates with said openings and with said source of liquid, said support member being rotatably mounted in said conduit means, said stuffing tube means being rotatable with said support member.

* * * * *